June 28, 1955 E. W. JACOBSON ET AL 2,711,833
EXTRACTOR FOR PARTICULATE MATERIAL
Filed July 9, 1952
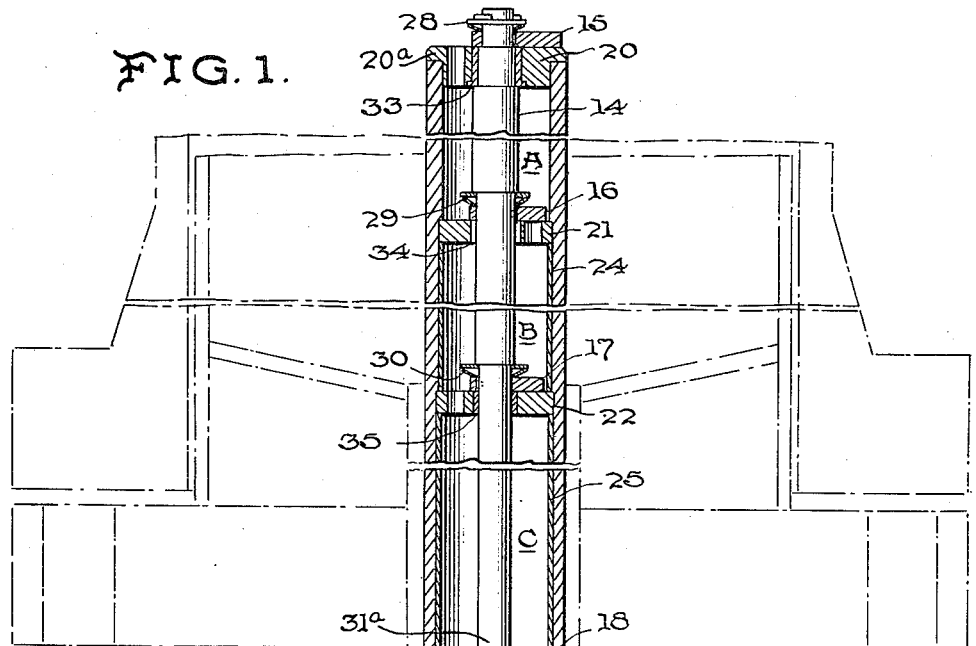
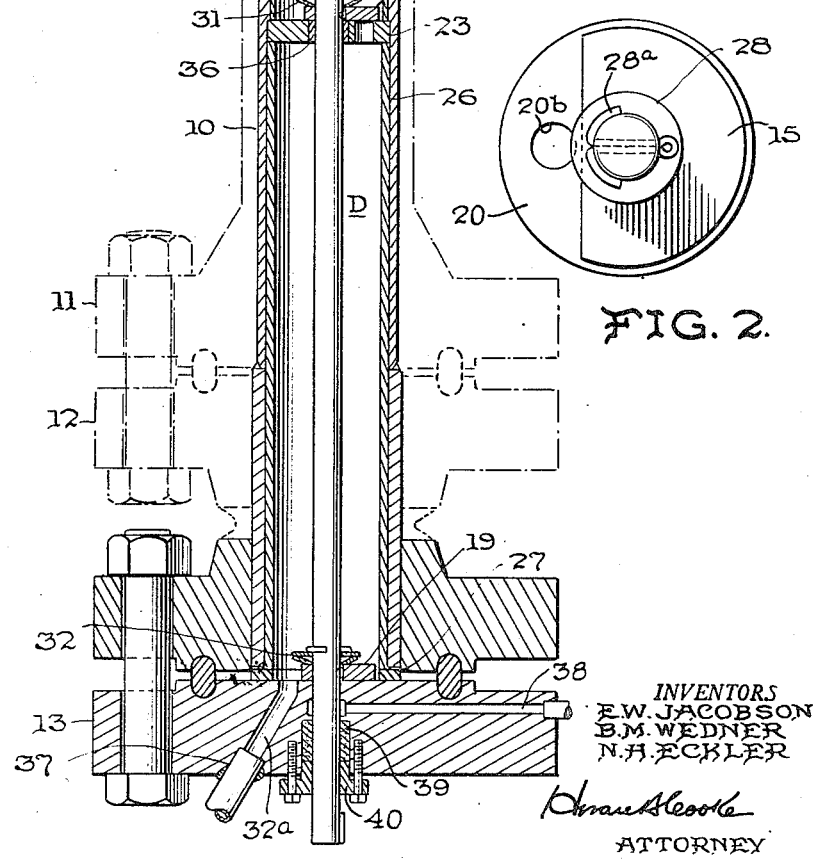
INVENTORS
E. W. JACOBSON
B. M. WEDNER
N. H. ECKLER
ATTORNEY United States Patent Office 2,711,833
Patented June 28, 1955

2,711,833

EXTRACTOR FOR PARTICULATE MATERIAL

Eugene W. Jacobson, Oakmont, Benjamin M. Wedner, Pittsburgh, and Norman H. Eckler, Cheswick, Pa., assignors to Gulf Research & Development Company, Pittsburgh, Pa., a corporation of Delaware Application July 9, 1952, Serial No. 297,966

8 Claims. (Cl. 214—17)

This invention relates to an extractor for particulate material and more particularly to apparatus for the periodic or continuous removal of particulate material from the interior of a pressurized chamber whereby the material thus removed is released at such relatively normal pressures and temperatures as to allow for convenient handling and treatment.

An advantageous application of this invention is in the petroleum refining industry where cracking of heavy crudes and fractions into lighter, lower-boiling products is effected by subjecting the charge stock to heat and pressure in the presence of catalyst within a closed vessel. In time, the catalyst particles in such a reactor become fouled from poisoning by chemically reactive impurities and from being coated with carbonaceous substances resulting from the decomposition of the original charge. This so-called coking of the catalyst reduces its activity by degrees and if allowed to continue would ultimately preclude any catalytic effect. But in order to maintain uniformity in the resulting cracked products and to permit proper regeneration of the catalyst for re-use the particles are removed from the reaction chamber before complete contamination and coking have occurred. To interrupt the normal operation of such a unit for removal and regeneration of catalyst is very expensive in that no yield is produced during such interruption. Moreover, a closing down of the reaction unit entails releasing the pressure and lowering the temperature with subsequent costly restoration of these conditions when operations are resumed.

Accordingly, it is an object of this invention to provide means for periodic or continuous removal of particulate material from the interior of a pressurized chamber without necessitating a shutting down of the chamber.

A further object is to provide a device for periodic or continuous removal of particulate material from the interior of a reaction vessel without interfering with the reaction occurring therein.

A further object is to provide an extractor assembly which can be easily and rapidly replaced by a spare assembly when corrosion and erosion have made imperative the replacement and reconditioning of the original extractor.

These and other objects are achieved by the present invention wherein desired quantities of material and entrained gases or liquids are withdrawn continuously from a pressurized chamber. The mixture is passed sequentially through a series of expansion chambers, the number depending on operating conditions, and released at reduced pressure and suitable temperature to handling means, the particular means not being a part of this invention. Such a stagewise removal of materials is achieved in this invention by passing the mixture through a cylindrical housing which has stationary apertured plates mounted inside at spaced positions along the length of the cylinder to divide the interior thereof into a series of communicating and progressively larger chambers. On a rotatable shaft passing axially through the cylinder, rotary valve plates are so mounted as to bear separately on adjoining stationary plates and to selectively open and close the apertures therein, whereby such valving action controls communication between adjacent chambers. As the cut-out section of each rotary valve plate passes over the aperture in the adjacent stationary plate the flow of material is permitted from one chamber to the next.

A detailed explanation of this invention will be made by reference to the drawings in which:

Figure 1 is a vertical elevation of the extractor mounted in place with appropriate pressure seals in the bottom of a reaction vessel.

Figure 2 is an end view of the top of the extractor showing the uppermost rotary valve plate and the aperture in the mating stationary plate, this view being representative of the plates separating adjoining chambers within the extractor.

With reference to Figure 1, it will be seen that the cylindrical housing 10 of the extractor is inserted into a pressurized reactor vessel, the outline of which is shown in broken lines, in such manner that the one end of the assembly is immersed in catalyst mixture. By means of an adapter flange 11 on the reactor and by a slip-on flange 12 the other end of the cylindrical housing is held in place. Axially positioned in the housing 10 is a valve driving shaft 14 upon which are mounted a number of rotary valve plates, 15 to 19 inclusive, which plates overlie and bear against stationary apertured plates 20, 21, 22 and 23, and a capping flange 13 positioned at the lower end of the housing 10. The stationary apertured plates 21 to 23, are mounted in the cylindrical housing 10 and are separated by spacers, 24 to 26, spacer 26 being supported by a gasket 27 and the aforementioned capping flange 13.

As will be apparent upon inspection of the drawings, the spacers 24 to 26 are cylindrical sleeves and each have the same internal diameters. It will also be noted that the spacers 24 to 26 are of different wall thicknesses, the spacer 25 having a greater wall thickness than spacer 24, and spacer 26 having a still greater wall thickness.

The stationary plates 21 to 23 have diameters equal to spacers 24 to 26, respectively, and the internal dimensions of the cylindrical housing 10 are complementary to the stationary plates 21 to 23 and the spacers 24 to 26 contained therein. The arrangement is such that the plates 25 and 26 are prevented from moving upwardly from the positions shown thereof in Figure 1 by the housing 10.

No spacer is provided or necessary between the stationary plates 20 and 21; inasmuch as the internal diameter of the cylindrical housing 10 above the plate 21 is the same as that of the spacers 24 to 26, and the spacer 20 includes a flange 20a that engages the upper end of the housing 10.

It will thus be seen that a series of progressively larger chambers A, B, C, and D are defined within the housing 10 with the stationary plates serving as partitions, through which the catalyst mixture sequentially passes in leaving the reactor.

The rotary valve plates 15 to 19 inclusive are keyed to the shaft and plates 15 to 18 are made to bear on the mating stationary apertured plates 20, 21, 22 and 23 by means of spring washers 28 to 31, thus assuring an intimate contact and pressure seal between the corresponding plates at all times. The rotary valve plate 19 is made to bear against the capping flange 13 by a spring washer 32. The capping flange or plate 13 has a passageway 32a therein that opens into the bottom of chamber D and which is selectively opened and closed by the rotary valve plate 19.

The spring washer 28, as best shown in Figure 2, is retained in position on the shaft 14 by a cotter pin 28a. The spring washer 32 is similarly retained on the shaft 14, however, somewhat different means are employed for retaining the spring washers 29 to 31. The shaft 14 is of stepped configuration, as shown, to provide shoulders overlying and engaging the spring washers 29 to 31, such as the shoulder 31a that engages and forms a seat for the spring washer 31. The internal diameters of the spring washers 28, 29, 30, 31, and 32 are such as to conform to the dimensions of the shaft 14.

It is to be noted that pressure differentials between adjacent chambers facilitates the effectiveness of the rotary valve plate closing the aperture in the stationary plate separating such chambers. For example, the valve plate 16 is urged into better sealing contact with stationary plate 21, when the pressure within the chamber A exceeds that within chamber B.

The seal between adjacent chambers achieved by the valve structure thus far described is supplemented by the provision of sealing means at the junctures of the shaft 14 and the stationary plates 20, 21, 22 and 23. Such sealing means comprises ring seals 33 to 36, inclusive, surrounding the shaft 14 at those points where the shaft 14 passes through the stationary plates 20, 21, 22 and 23.

During operation of the extractor, the shaft is rotated at any desired speed by means of suitable drive mechanism not shown but attached to the keyed lower end of the shaft. The rotary valve plates fastened to the shaft 14 are, as shown with respect to valve plate 15 in Figure 2, so shaped as to cover an area less than a complete circle so that for a minor portion of each complete rotation of each valve plate the aperture in the mating stationary plate is uncovered. To effect a stagewise removal the aperture or valve port in each stationary plate is offset in radial angularity and the rotary valve plate segments are all in alignment as is shown by Figure 1 in which the angle of aperture offset as between successive stationary plates is 180°. Alternatively, the apertures in the stationary plates may be positioned directly in alignment and each alternate rotary valve plate offset.

As the shaft is rotated the aperture 20b in the top plate 20 is exposed and particulate material and entrained gases and liquids flow from the reactor into chamber A, which at such time is sealed at its lower end by rotary valve plate 16. As rotation continues chamber A is closed at its upper end by plate 15 and subsequently opened at its lower end to chamber B. It will be evident from the particular embodiment shown in Figure 1 that while chamber A is being filled, material is also flowing into chamber C from chamber B, and at an alternate point in the rotation when material is entering chamber B that chamber D is also being filled. In this manner material flows by gravity and by pressure differential into the initial and succeeding chambers until pressures in the two adjoining chambers involved are equalized. This method of expanding the mixture in stages can be continued as often as necessary to reduce the pressure from initial reactor pressure down to the final pressure desired. The number of chambers will depend upon the relative proportions of solid, liquid, and gas, the initial and final pressures and temperatures, and whether heat is absorbed or released during the expansion process. The length or volume of each of the various chambers will be dependent on the amount and type of expansion desired which will in turn depend on the reactor conditions and the preferred final conditions of the mixture at the time it is discharged from the extractor to handling means. For example, an isothermal process could occur in the expansion of mixture from chamber A into chamber B where both chambers are wholly within the body of the reactor. Where the expansion is into those chambers outside the reactor there would substantially be an adiabatic expansion.

It should be noted that with respect to each chamber in the series, the two rotary valve plates controlling the two apertures communicating therewith function in a single complete cycle to perform the sequential operations of closing both apertures, then opening one of the apertures, thence closing the opened aperture, and finally opening the other aperture. In other words, such alternate closings occur in an overlapping manner. Such sequential operation results from the configuration and angular spacing of the rotary valve plates and the apertures in the stationary plates, as described above.

It will also be noted that the wiping action of the rotating plates on the mating stationary plates tends to make the hardened and polished rubbing surfaces self-cleaning and thus abrasion by the particulate material is reduced to a minimum. To further reduce erosion of the plates the openings in them should have sharp edges so that the flow of catalyst mixture is cut off cleanly and thereby prevented from becoming wedged between the two adjoining plates.

In leaving the final chamber D the mixture of solids and gaseous material passes through the passageway 32a and into a discharge tube 37. Within the body of the capping flange 13 is located a pressure equalizing passageway 38 by which means inert gas such as nitrogen is introduced into the shaft clearance space at a pressure equal to or higher than the pressure of the gases entrained in the particulate material passing through the final chamber D to thereby prevent leakage of those entrained gases along the shaft 14 into the atmosphere where they could create hazardous conditions. To prevent, in turn, the leakage of inert gas into the atmosphere packing rings 39 and stuffing box gland 40 surround the shaft below the pressure equalizing tube.

What we claim is:

1. Apparatus for removing a portion of gaseous and particulate material from a pressurized vessel which comprises a housing penetrating into said vessel, a series of stationary plates each having a valve port therethrough mounted in spaced relation along the length of said housing to define a series of chambers therebetween, a rotatable shaft axially positioned in said housing, valve plates mounted on said rotatable shaft in engagement with the stationary plates, said stationary plates and said valve plates being so constructed and arranged to alternately close the valve ports of alternate stationary plates during rotation of the shaft, said shaft being journaled through the final stationary plate of the series, and means for applying a fluid pressure about the portion of the shaft that is journaled through the final stationary plate.

2. In apparatus for removing material from a pressurized vessel, a hollow cylindrical housing, means defining a series of successively longer chambers of substantially uniform cross section within the housing, each of the chambers intermediate of the series having communication with the preceding and the succeeding chambers and the terminal chambers having external communication through the opposite ends of the housing, and interconnected means for alternately closing communication of each intermediate chamber with its preceding chamber and its succeeding chamber and also for closing external communication of the terminal chambers when such chambers have open communication with the chambers adjacent thereto, with successive closings of communication overlapping.

3. The combination of claim 2, wherein the first mentioned means includes a plurality of apertured plates axially spaced in the housing, said interconnected means comprising a shaft journaled through the plates, and rotary valve plates carried by the shaft, each of said valve plates engaging one apertured plate and being spaced from the other apertured plates.

4. The combination of claim 2, wherein the first mentioned means includes an apertured plate separating one chamber from the succeeding longer chamber, said interconnected means including a shaft journaled through the plate, a rotary valve plate in said one chamber and engaging said apertured plate, said shaft having a shoulder, and spring means interposed between the shoulder and the valve plate for urging the latter against the apertured plate.

5. In apparatus for removing material from a pressurized vessel, a hollow cylindrical housing, a plurality of apertured plates in the housing, a plurality of cylindrical spacers disposed between the apertured plates and axially spacing the latter in the housing to define a series of chambers in the housing, interconnected means for alternately closing the apertures of adjacent plates, with such closings overlapping, said interconnected means comprising a shaft journaled through said plates, and a plurality of rotary valve plates mounted on the shaft and engaging the sides of the apertured plates nearest one end of the housing.

6. In apparatus for removing material from a pressurized vessel, a hollow cylindrical housing, a plurality of transverse apertured plates disposed within the housing and defining a series of chambers, interconnected means for alternately closing the apertures of adjacent plates, with such closings overlapping, said interconnected means comprising a shaft journaled through said plates, a plurality of rotary valve plates mounted on the shaft and engaging the apertured plates, all of said rotary valve plates being disposed at and engaging solely the sides of the apertured plates adjacent one end of the housing, and spring means for urging the valve plates towards the apertured plates engaged thereby.

7. In apparatus for removing material from a pressurized vessel, a cylindrical housing and means defining a series of successively larger chambers within the housing, said means comprising a plurality of apertured plates disposed within the housing, and hollow cylindrical spacers disposed between and separating adjacent apertured plates and means for alternately closing the apertures of adjacent plates.

8. The combination of claim 7, wherein adjacent spacers have substantially equal internal dimensions and differing wall thicknesses, said cylindrical housing having internal dimensions substantially conforming to the external dimensions of such adjacent spacers and the apertured plate therebetween.

References Cited in the file of this patent
UNITED STATES PATENTS

| | | |
|---|---|---|
| 748,414 | Passburg | Dec. 29, 1903 |
| 2,138,356 | Ryan et al. | Nov. 29, 1938 |